United States Patent [19]

Peel

[11] Patent Number: 5,660,484
[45] Date of Patent: Aug. 26, 1997

[54] SHAFT WITH BEARING ASSEMBLY

[75] Inventor: Richard James Peel, Warwick, England

[73] Assignee: Nastech Europe Limited, Coventry, England

[21] Appl. No.: 748,879

[22] Filed: Nov. 14, 1996

[30] Foreign Application Priority Data

Nov. 23, 1995 [GB] United Kingdom ............... 95239208

[51] Int. Cl.$^6$ .................................................. F16C 43/04
[52] U.S. Cl. .................. 384/539; 384/517; 384/538; 384/585; 403/329; 464/162
[58] Field of Search ..................... 384/495, 498, 384/517, 518, 535, 536, 537, 538, 539, 563, 581, 582, 584, 585; 403/326, 328, 329; 464/134, 162

[56] References Cited

U.S. PATENT DOCUMENTS 4,189,251  2/1980  Bianco ........................ 403/261
4,979,834  12/1990  Speich ........................ 384/510

*Primary Examiner*—Thomas R. Hannon
*Attorney, Agent, or Firm*—Michael H. Minns

[57] ABSTRACT

To locate a bearing axially and concentrically on a shaft, a resiliently compressible assembly is slid along the shaft until its leading edge is restrained (e.g. by contacting a yoke at the end of the shaft), the bearing is slid along the shaft until it abuts the assembly, and a sleeve is slid along the shaft to abut the bearing. Further movement of the sleeve compresses assembly, whereupon three internally sprung fingers of the sleeve snap into corresponding detents in the shaft. Releasing the sleeve permits the assembly to exert a contrary force whereupon the finger ends engage the ends of the detents and provide axial location of the bearing. Internal cone surfaces of the bearing contact a split cone of assembly and an external cone surface of sleeve. The shaft may be part of a vehicle steering column with reach and rake adjustment.

23 Claims, 2 Drawing Sheets

SHAFT WITH BEARING ASSEMBLY

BACKGROUND OF THE INVENTION

The present invention relates to the manner of installing a bearing on a shaft, to a shaft assembly produced thereby, and more particularly to a bearing assembly suitable for such installation.

SUMMARY OF THE INVENTION

In one aspect of the present invention, this is accomplished by providing a shaft having at least one detent; a means for biasing mounted on the shaft; a bearing assembly mounted on the shaft, a first end of the bearing assembly abutting the means for biasing; and a retention means for axially retaining the bearing assembly, the retention means abutting a second end of the bearing assembly, the means for biasing biasing the retention means into engagement with the at least one detent.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
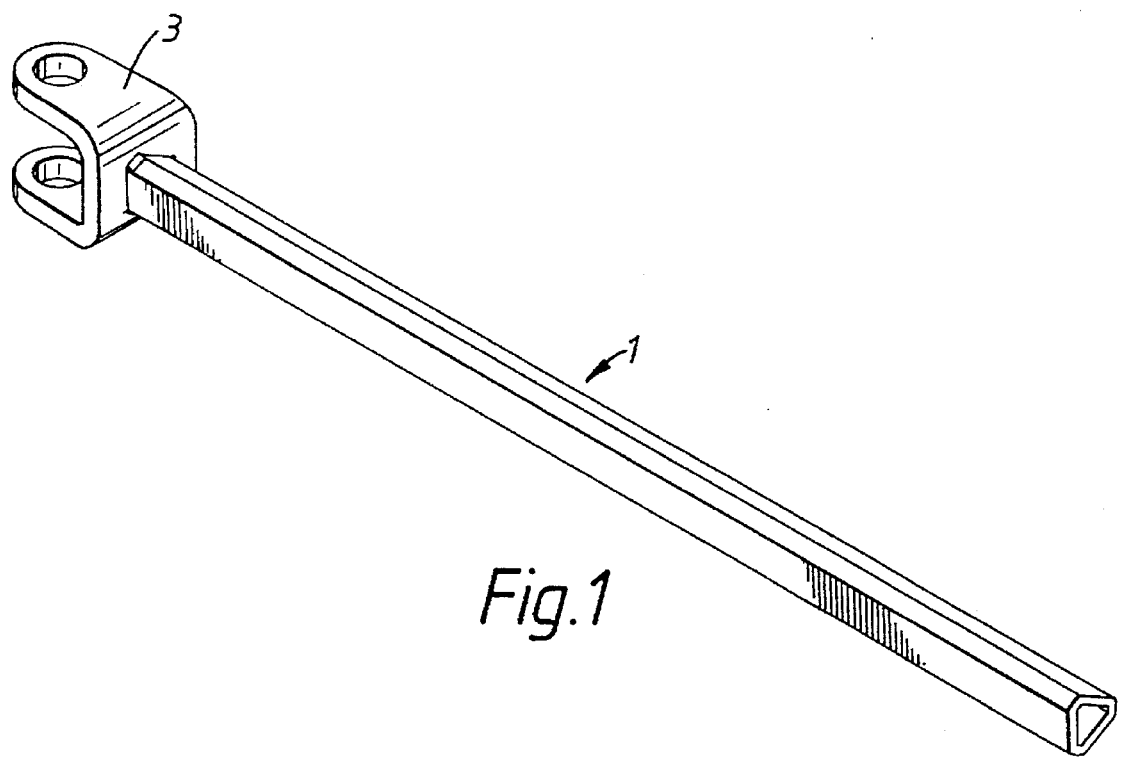
FIG. 1 shows a shaft forming part of a vehicle driving column assembly.
Figure 2:
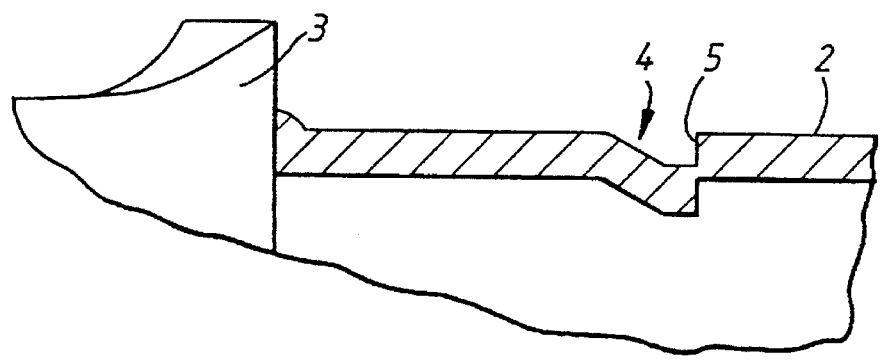
FIG. 2 shows a detail of the shaft of FIG. 1 in partial cross-section.

The invention provides a shaft assembly comprising a shaft provided with at least one detent, a resiliently compressible assembly mounted on the shaft, a first end of the compressible assembly being restrained in a predetermined position along the shaft from movement along the shaft in the direction of the first end, a bearing assembly slidable along the shaft so that one end abuts the second end of the compressible assembly, and a sleeve slidable along the shaft to abut the other end of the bearing assembly, the sleeve including at least one catch portion in engagement with said at least one detent when the sleeve and bearing assembly have been subjected to a force towards the compressible assembly, which is thereby compressed, said engagement of said at least one catch with said at least one detent resisting movement in the opposite direction, under the influence of decompression of said compressible assembly, when said force is released.

Such an assembly is formed by sliding the compressible assembly along the shaft to, or close to, its predetermined location, followed in turn by the bearing assembly and the sleeve. Force on the sleeve then compresses the compressible assembly, permitting the catch and detent to engage. The latter engagement, on relaxation of the force, and subjected to a contrary force provided by decompression of the compressible assembly, is such as to resist disassembly and to provide an accurate axial location for the bearing on the shaft.

The detent may be a slot though the shaft, or a recess or groove formed in the external shaft surface, and the catch portion may be a member which is sprung inwardly of the sleeve, for example a finger the end of which co-operates with a corresponding end surface of the detent to resist said movement in the opposite direction. In a preferred embodiment, the end of the finger and the end surface of the detent are both square to the shaft axis, but it would be possible to provide surfaces (e.g. a detent which an end surface which is undercut or has a lateral V-groove, and a correspondingly shaped finger end) for providing a positive camming action holding the finger in place, provided care was taken that the finger could not under-ride the sleeve. In such a case, it might be necessary to re-compress the compressible assembly to a significant degree to permit removal of the sleeve.

The resiliently compressible assembly may include at least one elastomeric or metallic spring (e.g. a disc spring).

To restrain the first end of the compressible assembly in its predetermined position along the shaft, the shaft can be provided with an abutment, which could be integral therewith, such as a yoke (for example, when the shaft is part of a steering column assembly). However, it will be clear that there are many other ways available to the skilled person for achieving the same function, e.g. a circlip (an abutment not integral with the shaft), or a means of fastening the assembly at its first end to the shaft (such as a pin).

Preferably, the bearing assembly, and at least one of the resiliently compressible assembly and the sleeve, are provided with co-operating cone faces for ensuring accurate radial location of the bearing assembly. Preferably, at least one of the resiliently compressible assembly and the sleeve has an external cone face portion and is at least partially split thereat; either of itself, or under the influence of forces in the shaft assembly, the external split cone face portion may grip the shaft and so provides accurate radial location of the bearing assembly. In a preferred embodiment, the external cone face portion of the compressible assembly is provided by a separate split cone member which of itself grips the shaft.

In a preferred embodiment the shaft is part of a vehicle steering column and is hollow with a generally triangular external axial cross-section, the detent is a slot provided at an apex thereof, and the catch portion is an inwardly sprung finger. Preferably there are three detents and fingers. In this embodiment, the sleeve has a generally circular internal cross-section, but with internal projections which engage the sides of triangular cross-section, so to locate the sleeve circumferentially on the shaft with fingers and slots aligned.

However, it should be understood that the invention may be employed with shafts having different cross-sectional shapes, and with solid shafts. Where a shaft has a circular external cross-section, alignment of catches and detents may need to be performed visually or by trial and error. However, it is also possible to avoid the need for circumferential alignment altogether, for example by using a detent in the form of a circular groove.

The invention also provides a bearing assembly for use in a shaft assembly as described above, which comprises an inner race having cone faces at one or both ends, an outer race spaced from the inner race by bearing members, and a housing accommodating the outer race.

FIG. 1 shows a shaft 1 which could form part of a vehicle steering column assembly providing for reach adjustment, by mutual sliding action between two parts of the column. This steering column assembly could additionally have rake adjustment and/or a collapsible safety portion. Relative rotation between two nested shafts which are capable of undergoing mutual sliding can be avoided by giving the shafts a non-circular cross-section.

Figure 4:
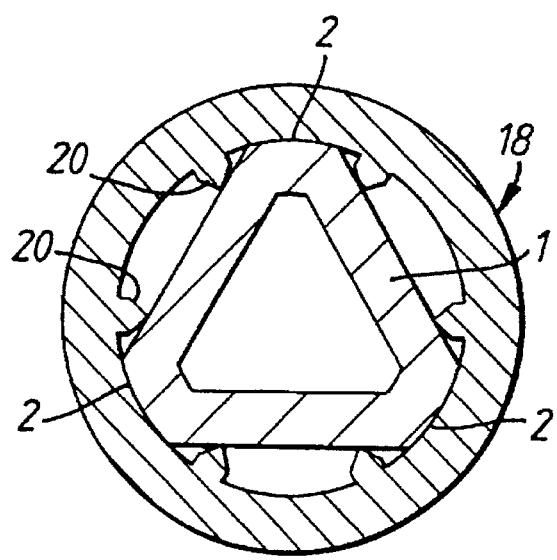
FIG. 4 is an axial cross sectional view taken along the line 4—4 of FIG. 3.

The shaft of FIG. 1 comprises a hollow tube with a generally equilateral triangular section, as shown in more detail in FIG. 4, although the apexes 2 thereof are rounded. The end of the shaft 1 at which the bearing is to be secured is terminated by a yoke 3.

Near the yoke 3, a recess 4 is formed in the shaft 1, in an apex 2 of its cross-section, for example by stamping. Preferably such a recess 4 is formed in two apexes 2, or, more preferably, in each apex 2, at the same longitudinal location. Preferably, the end 5 of the recess 4 is square to the length of the shaft 1.

Figure 3:
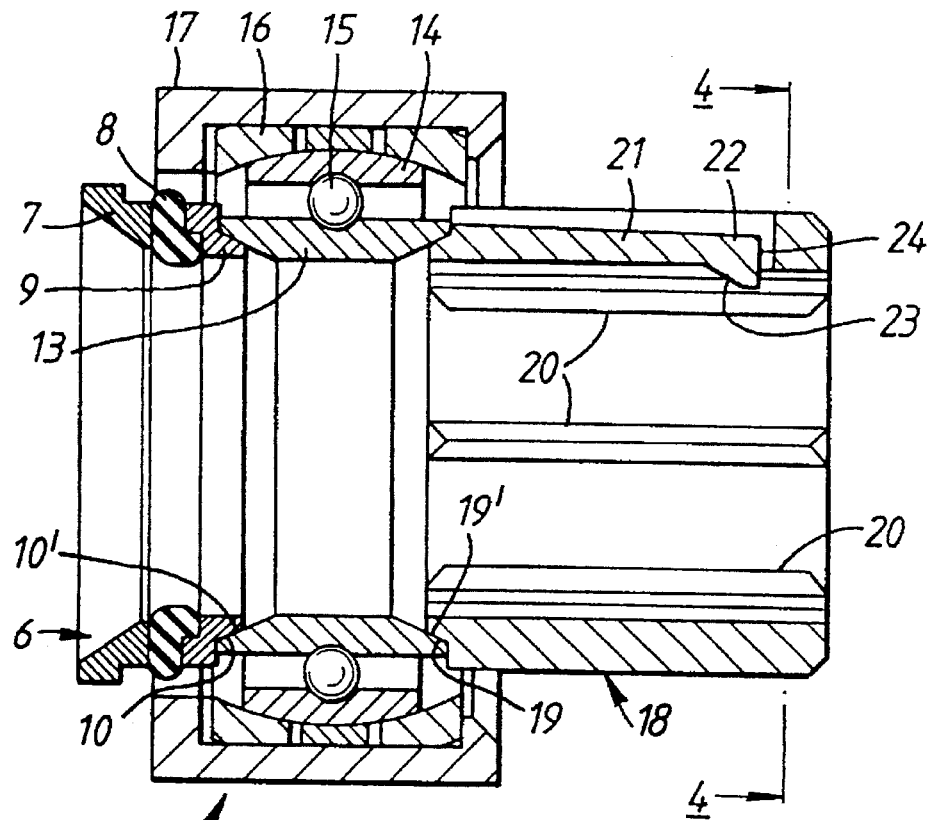
FIG. 3 shows part of a preferred embodiment of shaft assembly in longitudinal cross-section.

FIG. 3 shows part of a shaft assembly including a compressible assembly 6, the latter comprising an elastomeric spring in the form of a rubber annulus 8 sandwiched between an acetal spacer 7 and a split cone 9 having an external cone surface 10. This assembly is slid along the shaft 1 until the spacer abuts the yoke 3 (neither the shaft nor its yoke are shown in FIG. 3), for longitudinal location, with the split cone 9 gripping the shaft 1 for radial location.

The bearing assembly 12 shown in FIG. 3 is of annular form, and consists of an inner race 13 separated from an outer race 14 by a single row of metallic ball bearings 15. The inner race is of conventional grooved tubular construction with end bores having internal cone surfaces 10'19', the surface 10' co-acting with cone surface 10. The outer race, with external part-spherical surface, is mounted in an acetal liner 16, which, in turn, is axially located inside a housing 17 of molded glass reinforced nylon, or of zinc based die cast construction.

The bearing assembly 12 is slid along shaft 1 to abut the compressible assembly 6 with the conical surfaces 10, 10' in engagement.

A generally cylindrical sleeve 18 is then slid along the shaft 1 until the surface 19 of an external cone at one end thereof engages with the conical surface 19'. The sleeve 18 has six internal projections 20, pairs of Which engage respective sides of the shaft 1 and provide rotational location of the sleeve 18 on the shaft 1. The latter function can be provided by other means known per se, and the number of projections 20 can be varied.

The sleeve 18 is formed with a number of internally sprung fingers 21, the number and location thereof corresponding to the number and location of detents 4 on the shaft 1. As shown, each finger 21 has an enlarged end portion 22 with a camming surface 23 enabling the finger 21 to rise as it slides over the end of the shaft 1, and along an apex 2 of the tube cross-section.

Once in abutment with the bearing assembly 12, the sleeve 18 is pushed further to compress the rubber annulus or spring 8, whereupon the finger end(s) 22 snaps into the detent(s) 4. When the sleeve 18 is released, the spring 8 exerts a force in the opposite direction, thus bringing end surface (s) 24 of the finger(s), which is(are) formed square to the length of the sleeve 18, into contact with the squared surface 5, and axially locking the bearing assembly 12 in the desired position on the shaft 1. The bearing assembly 12 is accurately located concentrically of the shaft 1 by virtue of the cone surfaces 10, 10'19, 19'.

In this preferred embodiment, the parts 7–9 of the compressible assembly 6, and the sleeve 18 are annular, but there is nothing to prevent other shapes being adopted (for example, the annulus may be interrupted, or a shape conforming more closely to the external tube shape) as long as (a) the assembly 6 and sleeve 18 can be slid over the shaft 1; (b) the parts 7–9 coact as necessary; and (c) the end surfaces of the compressible assembly 6 and the sleeve 18 (in the preferred form, cone surfaces 10, 19) coact at least in part with the end surfaces (in the preferred form, internal cone surfaces 10', 19') of the bearing assembly 12 (thus if the bearing assembly was formed with a generally triangular internal aperture in lieu of the more conventional circular aperture 12, at least some of the sleeve 18 and the components 6–8 of assembly 6 could likewise be generally triangular).

Having described the invention, what is claimed is:

1. In combination:

a shaft provided with at least one detent;

a resiliently compressible assembly mounted on the shaft, a first end of the compressible assembly being restrained in a predetermined position along the shaft from movement along the shaft in the direction of the first end;

a bearing assembly slidable along the shaft so that one end abuts the second end of the compressible assembly; and a sleeve slidable along the shaft to abut the other end of the bearing assembly, the sleeve including at least one catch portion in engagement with said at least one detent when the sleeve and bearing assembly have been subjected to a force towards the compressible assembly, which is thereby compressed, said engagement of said at least one catch with said at least one detent resisting movement in the opposite direction, under the influence of decompression of said compressible assembly, when said force is released.

2. The combination according to claim 1, wherein said at least one detent is one of a slot through the shaft, a recess in the surface of the shaft or a groove in the surface of the shaft.

3. The combination according to claim 1, wherein said at least one catch portion is a member which is sprung inwardly of the sleeve.

4. The combination according to claim 3, wherein said member is a finger.

5. The combination according to claim 1, wherein said at least one detent is one of a slot through the shaft, a recess in the shaft or a groove in the shaft, and said at least one catch portion is a finger sprung inwardly of the sleeve, the end of said finger cooperating with a corresponding end surface of said detent to resist said movement in the opposite direction.

6. The combination according to claim 1, wherein said resiliently compressible assembly includes at least one elastomeric or metallic spring.

7. The combination according to claim 6 wherein, said resiliently compressible assembly includes at least one metallic disc spring.

8. The combination according to claim 1, wherein said shaft is provided with an abutment for restraining the first end of the compressible assembly in said predetermined position along the shaft.

9. The combination according to claim 8, wherein said abutment is a yoke.

10. The combination according to claim 1, wherein the bearing assembly, and at least one of the resiliently compressible assembly and the sleeve, are provided with cooperating cone faces.

11. The combination according to claim 1, wherein the shaft has a generally triangular external axial cross-section.

12. The combination according to claim 11, wherein said at least one detent is provided at an apex of said triangular cross-section.

13. The combination according to claim 11, wherein said sleeve has a generally circular internal cross-section, but with internal projections which engage the sides of said triangular cross-section.

14. The combination according to claim 1, wherein there are three said detents and catch portions.

15. The combination according to claim 1, wherein said bearing assembly comprises an inner race having cone faces at one or both ends, an outer race spaced from the inner race by bearing members, and a housing accommodating the outer race.

16. In combination:

a shaft having at least one detent;

a means for biasing mounted on the shaft;

a bearing assembly mounted on the shaft, a first end of the bearing assembly abutting the means for biasing; and a retention means for axially retaining the bearing assembly, the retention means abutting a second end of the bearing assembly, the means for biasing biasing the retention means into engagement with the at least one detent.

17. The combination according to claim 16, further comprising:

a means for axially retaining the means for biasing.

18. The combination according to claim 17, wherein the means for axially retaining the means for biasing is an abutment on the shaft.

19. The combination according to claim 16, wherein the bearing assembly and at least one of the means for biasing and the retention means have co-operating cone shaped abutting faces.

20. The combination according to claim 16, wherein said bearing assembly comprises an inner race having cone faces at one or both ends, an outer race spaced from the inner race by bearing members, and a housing accommodating the outer race.

21. The combination according to claim 16, wherein the shaft has a generally triangular external axial cross-section.

22. The combination according to claim 21, wherein said at least one detent is provided at an apex of said triangular cross-section.

23. The combination according to claim 21, wherein said sleeve has a generally circular internal cross-section, but with internal projections which engage the sides of said triangular cross-section.

* * * * *